(12) United States Patent
Herder (10) Patent No.: US 7,721,109 B1
(45) Date of Patent: May 18, 2010

(54) SECURE TRANSACTION CARD USING BIOMETRICAL VALIDATION

(75) Inventor: Thomas J. Herder, Cedar Rapids, IA (US)

(73) Assignee: Verizon Business Global LLC, Basking Ridge, NJ (US)

( * ) Notice: Subject to any disclaimer, the term of this patent is extended or adjusted under 35 U.S.C. 154(b) by 1763 days.

(21) Appl. No.: 09/627,558

(22) Filed: Jul. 28, 2000

(51) Int. Cl.
*G06F 21/00* (2006.01)
*G06F 7/04* (2006.01)
*G06Q 20/00* (2006.01)

(52) U.S. Cl. .................. 713/186; 713/185; 713/182; 705/64; 705/67; 726/27

(58) Field of Classification Search ............... 713/186, 713/185, 182; 704/246; 726/27; 705/64, 705/67
See application file for complete search history.

(56) References Cited

U.S. PATENT DOCUMENTS

| | | | | |
|---|---|---|---|---|
| 4,998,279 A | * | 3/1991 | Weiss | 340/5.52 |
| 5,406,619 A | * | 4/1995 | Akhteruzzaman et al. | 379/93.02 |
| 5,623,539 A | * | 4/1997 | Bassenyemukasa et al. | 379/88.02 |
| 5,802,199 A | * | 9/1998 | Pare et al. | 382/115 |
| 5,893,057 A | * | 4/1999 | Fujimoto et al. | 704/246 |
| 5,897,616 A | * | 4/1999 | Kanevsky et al. | 704/246 |
| 5,949,874 A | * | 9/1999 | Mark | 379/283 |
| 6,012,039 A | * | 1/2000 | Hoffman et al. | 705/14 |
| 6,185,316 B1 | * | 2/2001 | Buffam | 382/115 |
| 6,199,067 B1 | * | 3/2001 | Geller | 707/10 |
| 6,320,974 B1 | * | 11/2001 | Glaze et al. | 382/115 |
| 6,324,271 B1 | * | 11/2001 | Sawyer et al. | 379/142.05 |
| 6,484,260 B1 | * | 11/2002 | Scott et al. | 713/186 |
| 6,542,729 B1 | * | 4/2003 | Chmaytelli et al. | 455/410 |
| 2001/0048025 A1 | * | 12/2001 | Shinn | 235/382 |

OTHER PUBLICATIONS

Boves, Lou; Os, Els den; Speker Recognition in Telecom Applications, 1998, IEEE; p. 203-208.*
Campbell, Jr. Joseph P.; Speker Recognition: A Tutorial, Sep. 1997, Proceedings of the IEEE, vol. 85, No. 9, pp. 1437-1462.*

* cited by examiner

*Primary Examiner*—Christopher J Brown (57) ABSTRACT

A validation scheme for use with a transaction card such as a calling card, et cetera, using personalized biometric profile data that is inherently coupled to the card owner/user. A configuration process is used for populating a profile database with sample voice or other biometric responses elicited from the owner/user in response to a plurality of questions relating to information uniquely linked to the user such as, e.g., name, age, hobbies, et cetera, or biometric responses such as fingerprints, retinal scans, and palm prints, or implanted ID chips. When a transaction is attempted using the transaction card, a determination is made if a voice profile validation is required for authentication. If so, a question from the plurality of questions used in the configuration process is randomly selected and directed to the user for a response. Access is provided only if a match between the response and corresponding sample is found. In a passive mode, the validation scheme may be utilized as an auxiliary fraud prevention scheme in addition to existing authentication systems.

17 Claims, 7 Drawing Sheets

SECURE TRANSACTION CARD USING BIOMETRICAL VALIDATION

BACKGROUND OF THE INVENTION

1. Technical Field of the Invention

The present invention relates generally to access control systems and methods, and more particularly, to a secure transaction card, e.g., a calling card, that uses biometric profiling for validation and access control.

2. Description of Related Art

Access control schemes are a key component in today's fraud detection systems used with respect to transactions that involve a transaction card and the like. For example, as is well known, calling or phone cards, credit cards, Automated Teller Machine (ATM) cards or debit cards, et cetera, typically require entering a correct Personal Identification Number (PIN) as an access control mechanism. To further increase security, some transaction cards have an integrated circuit (e.g., Smart Cards) which facilitates encryption of a legitimate cardholder's personal identity information and other data.

Although there have been impressive advances in the existing access control schemes designed to reduce costs to a card-issuing entity and its customers, current solutions are not entirely satisfactory. First, there is no sure way that any current system can guard against all forms of fraud, and there is no tangible means of determining what the actual fraud costs are. Moreover, the same technological advances that have increased security by means of encryption are also making it possible for illegitimately deciphering access codes etc.

In addition, current access control schemes are typically static, i.e., the same access code is used for each and every transaction by a user and, accordingly, the same verification scheme is also employed by the fraud detection system associated therewith. Thus, the probability of a successful attack by an unauthorized party to decipher an access code or password increases, thereby rendering the system vulnerable.

Those skilled in the art should appreciate that despite various improvements, transaction card-related fraud is still possible primarily because of two factors. First, cards and their PINs can still be easily stolen or misplaced. And, second, any access control scheme used in connection with a card can be reverse-engineered with luck and perseverance because the devices used as access control "gatekeepers" are typically alphanumeric codes, passwords, and the like which lend themselves to reproduction by somebody who does not own them.

SUMMARY OF THE INVENTION

Accordingly, the present invention is directed to a method of validating a user for a transaction based on biometric profiling that is inherently and uniquely coupled to the user such that reproducing a correct response required for access control by an unauthorized party is virtually impossible. Initially, a biometric profile is configured for the user, which includes a plurality of biometric samples relating to the user such as, e.g., voice responses to personalized questions, et cetera. The biometric profile is associated with an indicium (e.g., Personal Identification Number, card number, user name, etc.) assigned to the transaction card. When a transaction is attempted by the user at a terminal, the user is biometrically interrogated by the system which directs a question that is randomly selected from the plurality of questions used in the configuration process. Thereafter, the biometric response (e.g., voiceprint) generated with respect to the user in response to the step of biometrical interrogation is monitored in order to determine if the biometric response matches a biometric sample in the biometric profile of the user. If so, the user is approved for the transaction and access is accordingly provided.

In another aspect, the present invention is directed to a method of validating a user for a call to be effectuated over a Public Switched Telephone Network (PSTN) using a calling card. The validation method commences by configuring a personalized profile for the user, wherein the personalized profile includes a plurality of voice samples elicited from the user in response to a plurality of personalized questions directed to the user. Thereafter, the personalized profile is associated with an indicium assigned to the calling card. When a calling card transaction is attempted by the user, a determination is made if a voice verification is needed with respect to the user. If so, the user is queried by an Automated/Audio Response Unit (ARU) for a voice response to a question that is randomly selected from the plurality of personalized questions used in the configuration process. Thereafter, the voice response is verified to determine if it matches a corresponding voice sample in the voice profile of the user. If so, the user is approved for the calling card transaction.

In yet another aspect, the present invention is directed to a fraud prevention method for use in a transaction-card-based system having a conventional authentication process. The method involves first determining, by utilizing the conventional authentication process, if a fraudulent transaction is being attempted in the transaction-card-based system by a user using a transaction card. If so, the user is then biometrically interrogated in order to obtain a biometric sample from the user. The biometric sample is monitored whereby the user is denied access for the transaction in the transaction-card-based system if the biometric sample does not match an entry stored in a biometric profile database having information that is inherently associated with the transaction card's owner.

In yet further aspect, the present invention is directed to an access control system for use with a transaction-card-based scheme. The access control system comprises a network operable with a terminal used for interacting with a user in association with a transaction card. A controller is disposed in the network to query the user when the user attempts a transaction using the transaction card. A secure access server is disposed in the network, which responds to messages from the controller with respect to querying the user. A profile database is coupled to the server, which includes a plurality of biometric samples inherently coupled to the user. The biometric samples are associated with an indicium assigned to the transaction card such that when the user attempts the transaction, the controller queries the user for a response thereto. If the response does not match a corresponding entry in the profile database, the user is denied access for the transaction.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
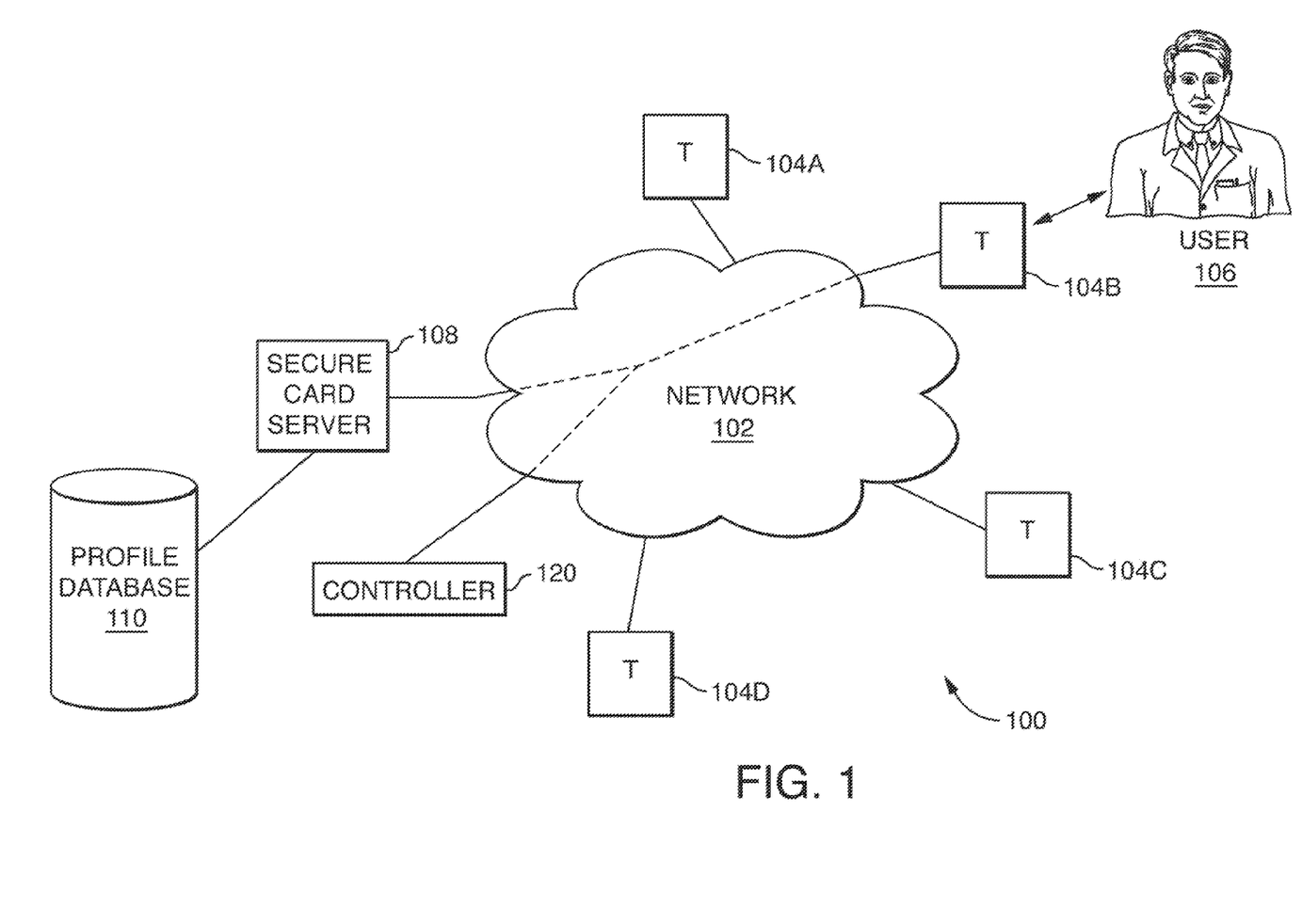
FIG. 1 depicts a functional block diagram of a network system provided in accordance with the teachings of the present invention for biometrically validating a user for a transaction.

In the drawings, like or similar elements are designated with identical reference numerals throughout the several views, and the various elements depicted are not necessarily drawn to scale. Referring now to FIG. 1, depicted therein is a functional block diagram of an exemplary communications system 100 provided in accordance with the teachings of the present invention for biometrically validating a user with respect to an on-line transaction to be effectuated using a transaction card such as, for example, a calling card or phone card, etc. A network 102 is included in the system 100 to exemplify a heterogeneous inter-networking environment which may include any combination of the following network portions: a wireline telecommunications network (i.e., the Public Switched Telephone Network or PSTN), one or several wireless telecommunications networks operating with known protocols, e.g., Time Division Multiple Access (TDMA), Code Division Multiple Access (CDMA), Global System for Mobile Communications (GSM), Multi-point Microwave Distribution System (MMDS), etc., and may also comprise an Internet Protocol (IP)-based packet-switched network (PSN) portion for providing Voice-over-IP (VoIP) telephony, e.g., an H.323 network or a Session Initiation Protocol (SIP) network, or the Internet. Those skilled in the art should further appreciate that the network 102 is also illustrative and inclusive of any proprietary or customized operator networks used for data transport, e.g., Local Area Networks (LANs), Wide Area Networks (WANs), Metropolitan Area Networks (MANs), Ethernet portions, Token Ring portions, etc., which interconnect the various nodes and equipment used for effectuating the biometrical validation scheme of the present invention, as will be described in greater detail hereinbelow.

A plurality of telecommunications devices, e.g., Internet phones, SIP phones, H.323 terminals, Information Appliances, POTS wireline phones, mobile stations, computers having suitable Telephony Application Programming Interfaces (TAPIs), etc., collectively referred to as "terminals" hereinafter, are provided in the network system 100 such that a user/subscriber may place a call, engage in a transaction, or otherwise interact with the network system, using an appropriate terminal and the transaction card issued to the user. Furthermore, in accordance with the teachings of the present invention, the terminals are provided with the capability to capture the user's biometric responses, e.g., voice, ocular, or other biometric patterns, etc., in addition to keypad inputs such as Dual Tone Multi-Frequency (DTMF) codes. Four terminals, T 104A-T 104D, are exemplified in FIG. 1, wherein the user 106 interacts with T 104B with respect to an on-line transaction. A controller 120 interacts with a secure card server 108 provided in the network system 100, which is coupled to a biometric profile database 110, for the purpose of validating the user 106 when the user attempts to engage in the on-line transaction using the transaction card.

Figure 2:
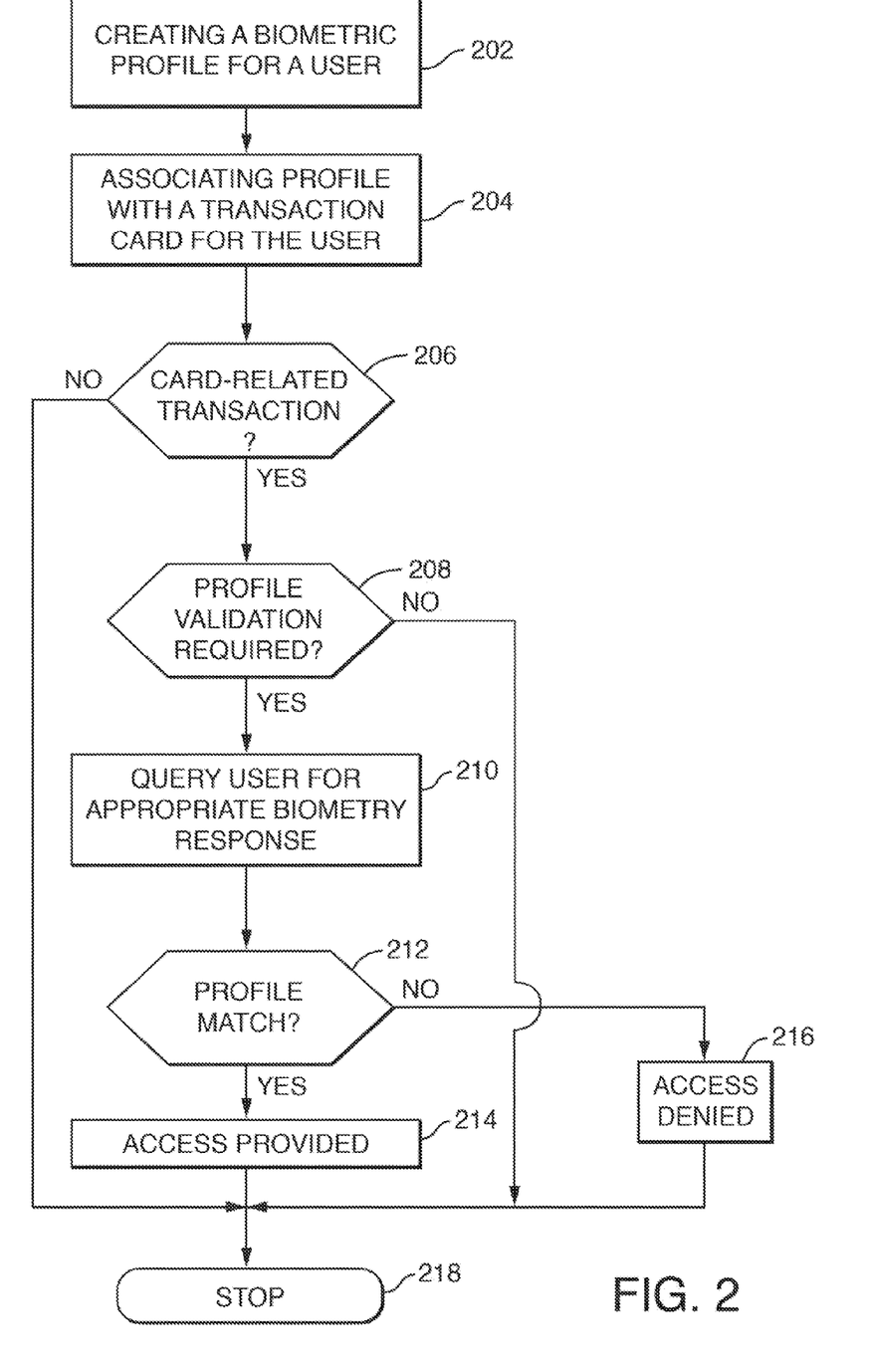
FIG. 2 depicts a flow chart of the steps of an exemplary embodiment of the biometrical validation scheme of the present invention.

FIG. 2 depicts a flow chart of the steps of an exemplary embodiment of the biometrical validation scheme in general operation. During initialization, a biometric profile is created or configured for the user, either on-line or off-line, by obtaining a plurality of biometric samples relating to the user (step 202). For example, such samples may comprise voice responses provided by the user in response to personalized questions that the user is required to answer during the configuration process. Preferably, the profile may be defined via a menu of selectable and/or prompted options that require personalized input such as: user name, indicia, e.g., Personal Identification Number (PIN) or card number and the like, and personal data such as age, weight, Social Security Number, maiden name, nick name(s), hobby(ies), favorite movie/star/celebrity, favorite book/music/band, most favorite scientist/politician, blood type, etc. For the purposes of biometric profiling, user responses are preferably provided as voice inputs, although it should be apparent that DTMF key codes may also be provided as a further embodiment. Accordingly, the profile database 110 (shown in FIG. 1) may comprise both non-DTMF responses and DTMF responses in certain implementations.

Similarly, other biometric parameters or patterns may be profiled for the user in the configuration process (step 202). Fingerprinting, facial pattern recognition, retinal signatures, etc. may be used for populating the biometric profile database in conjunction with voice and DTMF key inputs.

Thereafter, as indicated in step 204, an association is made in the network system 100 (shown in FIG. 1) between the user profile data (DTMF and non-DTMF) and the transaction card issued to the user by an authorized entity, e.g., Government agencies (access cards), telephone companies (Telcos) (calling cards), credit card companies, credit bureaus (access to credit reports), financial institutions such as banks, credit unions (account access cards), Internet businesses or e-commerce entities (secure access), companies providing employee access to corporate or personal information or services, and the like. It should be realized by those skilled in the art that by making the association between the personalized responses (i.e., profiles and samples therein) and the transaction card in accordance with the teachings of the present invention, an inherent and intimate bonding is achieved between the card and the user such that it thwarts fraudulent/unauthorized use of the transaction card. Accordingly, the user does not have to worry about losing a card, remembering a PIN, or having to conceal a card number and the PIN associated therewith.

When a card-related transaction is attempted by the user using a suitable terminal (such as T 104B illustrated in FIG. 1) (decision block 206), a determination is made in the network system 100 (e.g., controller 120) whether a profile-based validation is required for the transaction card (decision block 208). If the profile-based validation is not required, the biometrical validation scheme of the present scheme may terminate (step 218) or, in some exemplary embodiments, may continue with other authentication schemes using PINs, DTMF inputs, etc. Also, it should be apparent that such non-biometric authentication procedures may be used in conjunction with the biometrical validation process provided in accordance herewith.

Continuing to refer to FIG. 2, after determining that a profile-based validation is required for the transaction card, an appropriate network entity queries the user for a biometric printing (step 210). For example, for a voice-based profile validation, a question may be randomly selected from the questions that were used in the profile configuration process and be directed to the user for a response. By speaking the answer into the terminal, a unique voiceprint response is obtained, which is subsequently matched with the corresponding sample in the profile database (decision block 212). Those skilled in the art should realize that more than one sample may be provided in the profile database for a particular question such that a range may be provided therewith, and any normal variations in the response may be accounted for accordingly.

If there is no match found between the response and the sample, access may be denied to the user for that transaction (step 216). On the other, access is provided where there is a match (step 214) so that the user may proceed with the transaction. Thereafter, the biometrical validation scheme may cease (step 218), unless further transaction sessions are engaged. That is, once authorized for a session, re-validation is not required. Once again, a non-biometric authentication procedure may be employed in conjunction with the present scheme whether or not access is provided based on the profile validation process.

Figure 3:
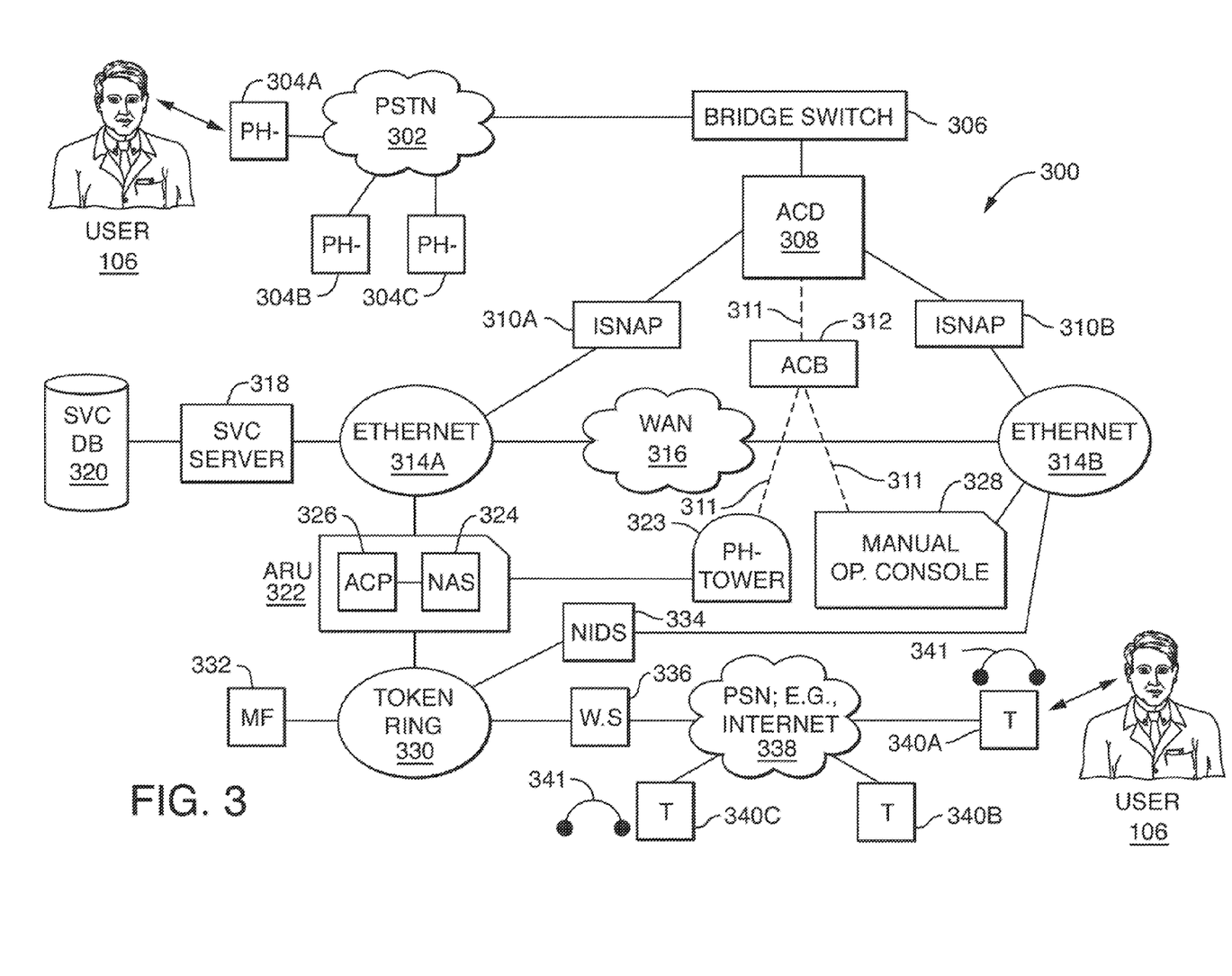
FIG. 3 is a functional block diagram of a presently preferred exemplary embodiment of the present invention which utilizes a voice-based validation method.

Referring now to FIG. 3, depicted therein is a functional block diagram of a presently preferred exemplary embodiment of a voice-based validation scheme for use in a hybrid telecommunications network 300 having a PSTN portion 302 and a PSN portion 338. A plurality of wireline phones, e.g., PH 304A-PH 304C, are conventionally provided with respect to the PSTN portion 302. A bridging switch 306 is connected to the PSTN 302, which sends calls to an Automated Call Distributor (ACD) 308 based upon call association. The ACD 308 routes the calls based upon its configuration information, and in conjunction with an Intelligent Services Network Adjunct Processor (ISNAP) acting as a signaling gateway (e.g., ISNAP 310A and ISNAP 310B), to a suitable application platform, which comprises an Automated/Audio Response Unit (ARU) 322 or a Manual Telecom Operator Console (MTOC) 328. It should be readily apparent to those skilled in the art that ARU and MTOC, which may be co-located or placed separately, form a Call Center of a service provider. One or more corporate/private Ethernet portions, e.g., Ethernet 314A and Ethernet 314B, may typically be provided at the Call Center (also referred to as the Operator Center sometimes) for furnishing connectivity between the ISNAP elements and the application platforms (i.e., ARU 322 and MTOC 328). It is also possible that these application platforms may be located on different LAN segments at the same site, or may be located at different sites and a WAN 316 may be suitably provided therebetween for data link connectivity.

Continuing to refer to FIG. 3, the ACD operates as a switching system designed to queue and/or distribute a large volume of incoming calls to the next available "answering position," whereby calls are categorized by the calling number and are directed to the appropriate processing entity. The ARU functions as a type of automated operator console, comprising an Automated Call Processor (ACP) 326 and a Network Information Distributed Services (NIDS) Audio Server (NAS) 324. ACP 326 processes the calls and works in cooperation with NAS 324 which provides voice scripting. NAS 324 is attached to a phone tower 323 where each call is received. Preferably, the ARU includes several ports for processing the individual calls and uses the NAS for voice services. Accordingly, it is NAS 324 that plays and stores all audio files used by the ACP application to provide automated call processing. The NAS also provides audio detection for the ARU through DTMF, tone, and voice recognition. Thus, whereas the NAS provides the audio interface, the ACP furnishes the data interface. It should be appreciated that in general, calling card calls are typically routed to the ARU via the ISNAP.

As has been briefly alluded to in the foregoing, the ISNAP operates as a signaling gateway between the application platforms and ACD 308 by utilizing appropriate algorithms to determine the call distribution among the operator positions for the ACD. This process is typically referred to as group selection and, upon completion of the process, the resulting operator work group is returned to the ACD. The work group specifies the operator group that is to treat the call, and the call is subsequently forwarded to the next available console within the selected group to process the call.

In the presently preferred exemplary embodiment, the MTOC—the manual application platform—runs operator console applications that support the Intelligent Services Network (ISN) products. A plurality of T1 Audio channels 311 are provided between an Audio Channel Bank (ACB) 312 and ACD 308, the phone tower 323, and MTOC 328, respectively. The operator console applications use audio interface hardware (not shown in this FIG.) to receive audio via the ACB, and get call data from the ISNAP via an Ethernet network connection. The console identifies incoming calls and, through interaction with ISN databases, provides the necessary scripting and call flow for the operator.

Still continuing to refer to FIG. 3, the ARU is coupled to a Token Ring network 330 which interconnects various telecommunications and processing equipment, e.g., a mainframe computer (MF 332), a Web server 336, and a NIDS server 334 which may also be connected to one of the Ethernet portions provided at the Operator Network Center (ONC). Preferably, the NIDS system is designed to maintain dynamic connections between remote applications and services residing on an ONC LAN. NIDS server 334 provides access to databases and validation service applications via a client/server relationship. Typically, billing data, customer information, service data such as call restriction data, are included in these databases.

In accordance with the teachings of the present invention, a Secure Voice Card (SVC) server 318 is preferably provided as a NIDS node on the Ethernet portion 314A to which the ARU is also connected. Those skilled in the art should understand upon reference hereto that the SVC server is analogous to the secure card server 108 provided in the network system 100 of FIG. 1, and runs an SVC service application which provides access to an SVC customer profile database 320 for configuration and biometrical validation purposes. The ARU, accordingly, operates as a client to the SVC server with respect to the presently preferred exemplary embodiment of the voice-based validation scheme of the present invention.

The Web server 336 provided in the network 300 operates as a "gateway" towards the PSN portion 338 (e.g., the Internet). A plurality of IP-compatible devices, e.g., T 340A-T 340C, are available for the user 106 to place calls, engage in e-commerce transactions, etc., using his transaction card. Appropriate means such as, e.g., headsets/microphones 341, are also included with the terminals to facilitate interrogation of the user and user voice sampling with respect to the voice-based validation scheme.

The general operation of the voice-based validation scheme for use in the network system 300 described above may now be set forth at this juncture. First, the card user places a calling card-based call in a conventional manner, i.e., the user listens for chime and enters the card number. Thereafter, the user may press the "#" key to bypass the PIN number to enter a voice profile system. Even if the PIN is entered (which is optional), the scheme may be aware that the user has a voice profile and could optionally require voice-based validation for the transaction being attempted. The system generates a random query from the user's personal profile (i.e., select a single entry among the plurality of entries in the SVC database), prompting the user for input. The user is then required to speak the response or enter appropriate DTMF keys. Card access may be granted for the matching voiceprint, DTMF response, or both. During or after the validation process, the terminating number or its speed-dial number may be entered and, upon subsequent transaction authorization, the call may be connected to the terminating number, whereby upon answering (pick up) a conversation takes place over the voice trunk. Once the system is accessed following authorization, subsequent calls may be made or mis-dialed numbers could be re-dialed without requiring further authentication. That is, only one validation event may be required for a single session which may include several different calls.

Figure 4A:
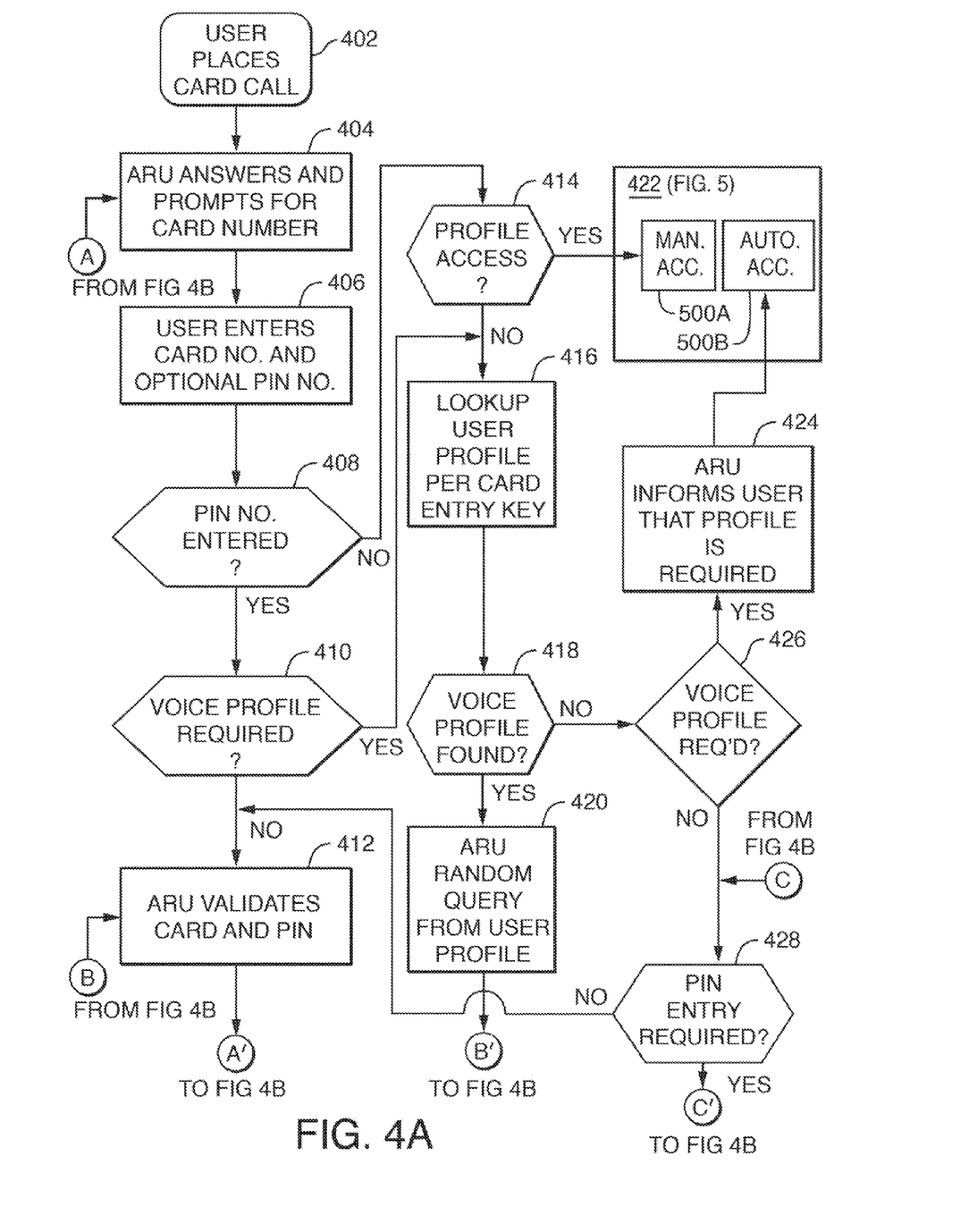
FIGS. 4A-4C depict a flow chart of a presently preferred exemplary embodiment of the voice-based validation method provided in accordance with the teachings of the present invention.
Figure 4B:
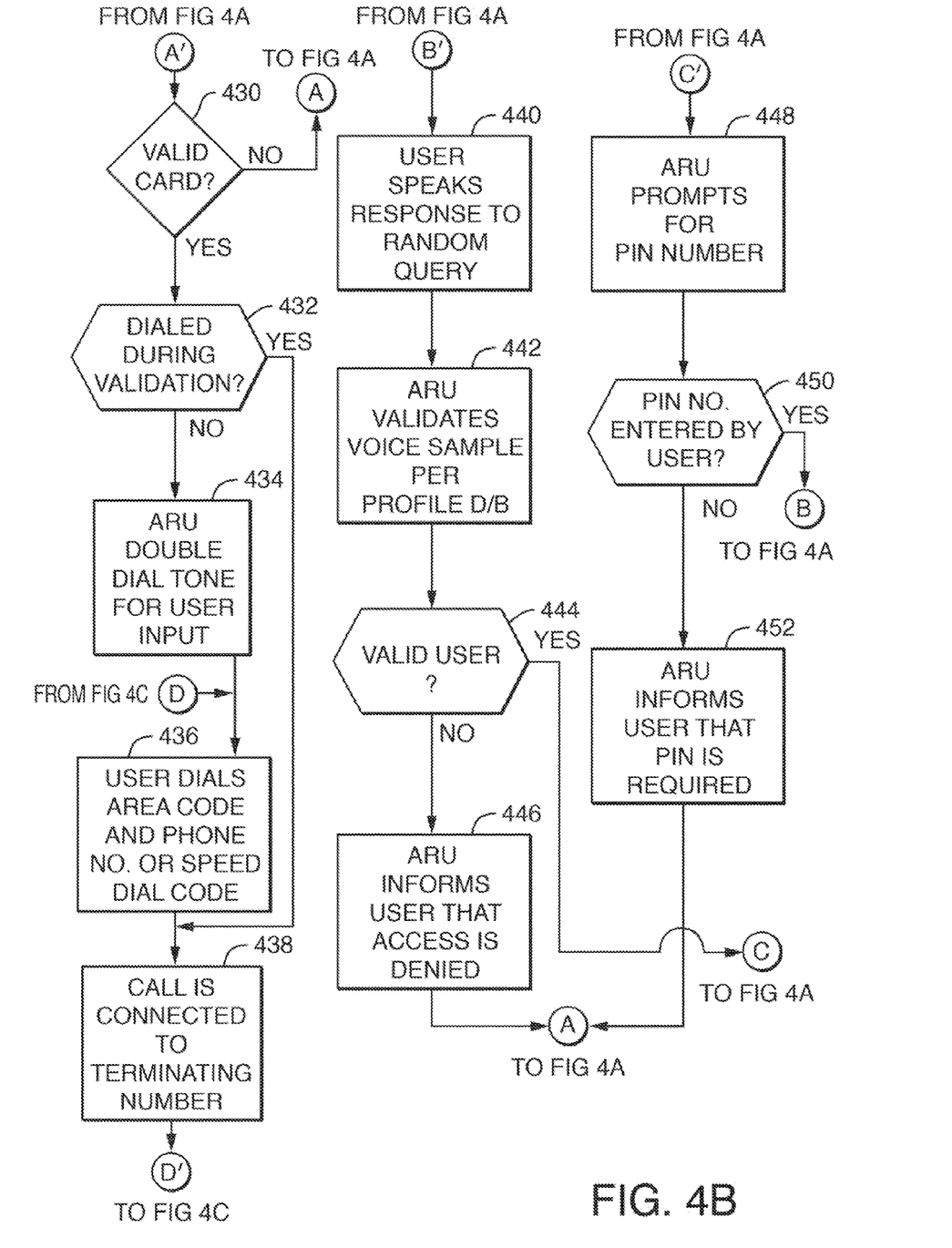
Figure 4C:
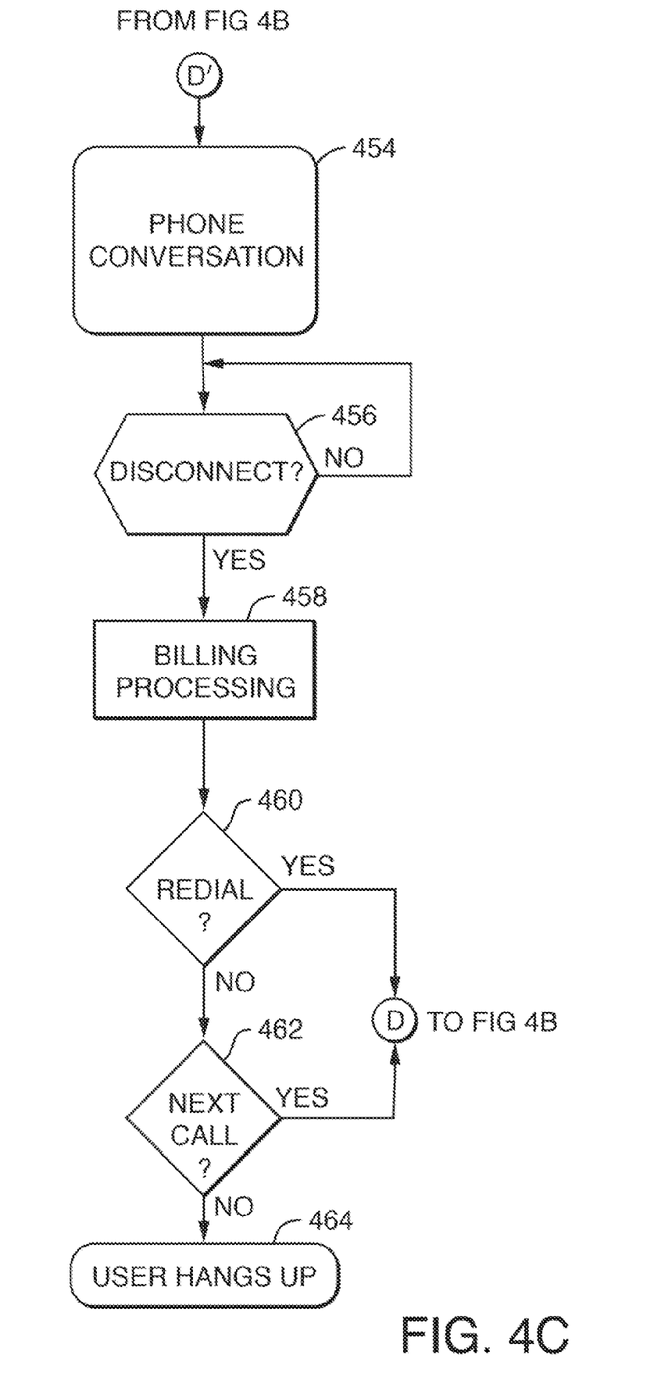

FIGS. 4A-4C depict in greater detail a flow chart of the voice-based validation method described above. When the user places a calling card call (step 402), the ARU answers and prompts the user for the card number (step 404). In response, the user enters the card number, and may optionally enter the PIN or a "#" to immediately bypass the PIN input (step 406). A determination is made if the PIN is entered (decision block 408) and, if the PIN is not entered, a further determination is made if the SVC profile for the user needs to be accessed (decision block 414). A "*" key may be used for indicating the YES response to enter the voice profile configuration subsystem (block 422) which will be described in further detail hereinbelow with respect to FIG. 5. On the other hand, a "#" may be used to indicate that access to the voice profile configuration subsystem by the user is not desired. Thereafter, the SVC server accesses the SVC database to look up the user profile based on the association between the card indicium (such as, for example, user name, card number assigned by the card issuing entity, PIN, embedded integrated circuit (IC)-based identification, user photograph, and the like) and the user profile (step 416).

If a voice profile for the user is found (decision block 418), the ARU selects a question or item from the profile randomly and queries the user for a response (step 420). On the other hand, if a voice profile for the user is not available, a further determination is made by the system as to whether a voice profile is required (decision block 426). If so, the ARU informs the user that voice profile is needed and, preferably, may prompt the user to access the voice profile configuration subsystem (step 424).

Referring back to the decision block 408, if the PIN is entered by the user, another determination is made (decision block 410) as to whether a voice profile is required for validation. If YES, the flow control of the validation scheme passes to step 416 wherein a voice profile look-up is performed for the card based on card indicia as explained hereinabove. On the other hand, if no voice profile-based validation is required, the ARU simply proceeds to validate the card based on the PIN entry (step 412). If the card is determined to be an invalid card (decision block 430), the flow control returns to step 404 whereby the user is informed that the card is invalid and, subsequently, the ARU prompts the user for another card number or a correct card number.

Referring again to the decision block 426, if the voice profile is not required, however, another determination is made (decision block 428) as to whether a PIN entry is required from the user (that is, whether or not the user previously entered a PIN as determined by the decision block 408). If not, the flow control returns to the path where the ARU proceeds to validate the card based on the PIN entry as determined by the decision block 408. If no PIN has been entered, on the other hand, the decision block 428 determines that a PIN is required and, subsequently, the ARU prompts the user for PIN entry (step 448). If the PIN is entered at this point (decision block 450), the flow control of the validation scheme again passes to step 412 whereby the ARU proceeds to validate the card and its PIN. If, for some reason, the PIN is not entered at this point, the ARU preferably informs the user that a PIN is required (step 452) and the flow control accordingly goes back to step 404 where by the user is prompted for a new card number entry.

Returning to step 420, wherein the ARU selects a question or item from the profile randomly and queries the user for a response, the user accordingly responds by speaking an answer (step 440). Those skilled in the art should realized that the voice profile database may be augmented with DTMF data also and, accordingly, a DTMF response may be entered by the user at this juncture.

Upon receiving the voice sample/response from the user, the ARU proceeds to validate the voice sample/response by matching it to a corresponding voiceprint (associated with the question selected for query) in the SVC database (step 442). If a match is found, the user is determined to be a valid user (decision block 444) and the flow control preferably passes to the decision block 428 wherein a determination is made if a PIN is also required. It should be apparent that in some implementations, only voice-based validation may be required, thereby bypassing the PIN entry at this juncture and proceeding directly to the transaction i.e., calling card-based call.

If the user is determined to be an invalid user per decision block 444, the ARU informs the user that access is denied (step 446) and the flow control preferably passes to step 404 for prompting the user for another card number or a correct card number.

Returning to block 430, upon validating the user based on voiceprinting and/or PIN entry as described in the foregoing, the flow control passes to the decision block 432 wherein a determination is made as to whether a terminating number (i.e., B-number) is dialed during the validation process. If so, the call is connected to the device/terminal identified by the terminating number (step 438). Otherwise, the ARU issues a double dial tone so that the user may enter the terminating number at this point (step 434). Subsequently, the user dials the complete terminating number or an abbreviated speed dial number (step 436). The call is then connected to that number as set forth in step 438.

Thereafter, the phone conversation (bearer traffic) takes place over the voice trunk (step 454) until disconnected (decision block 456). After getting disconnected, intentionally or otherwise, a billing process is effectuated for computing the toll/charge associated with the call (step 458). If the user presses a redial key (e.g., a "*" key) (decision block 460) or a next call key (e.g., a "#" key) (decision block 462), the flow control returns to step 436, whereby an appropriate terminating number is provided and the call is subsequently connected thereto. This process may take place until the user hangs up the phone. Accordingly, it should be realized that once the user is validated by the voice profile system for a session, the user may continue to redial or enter other terminating numbers without having to be re-validated for the session.

Figure 5:
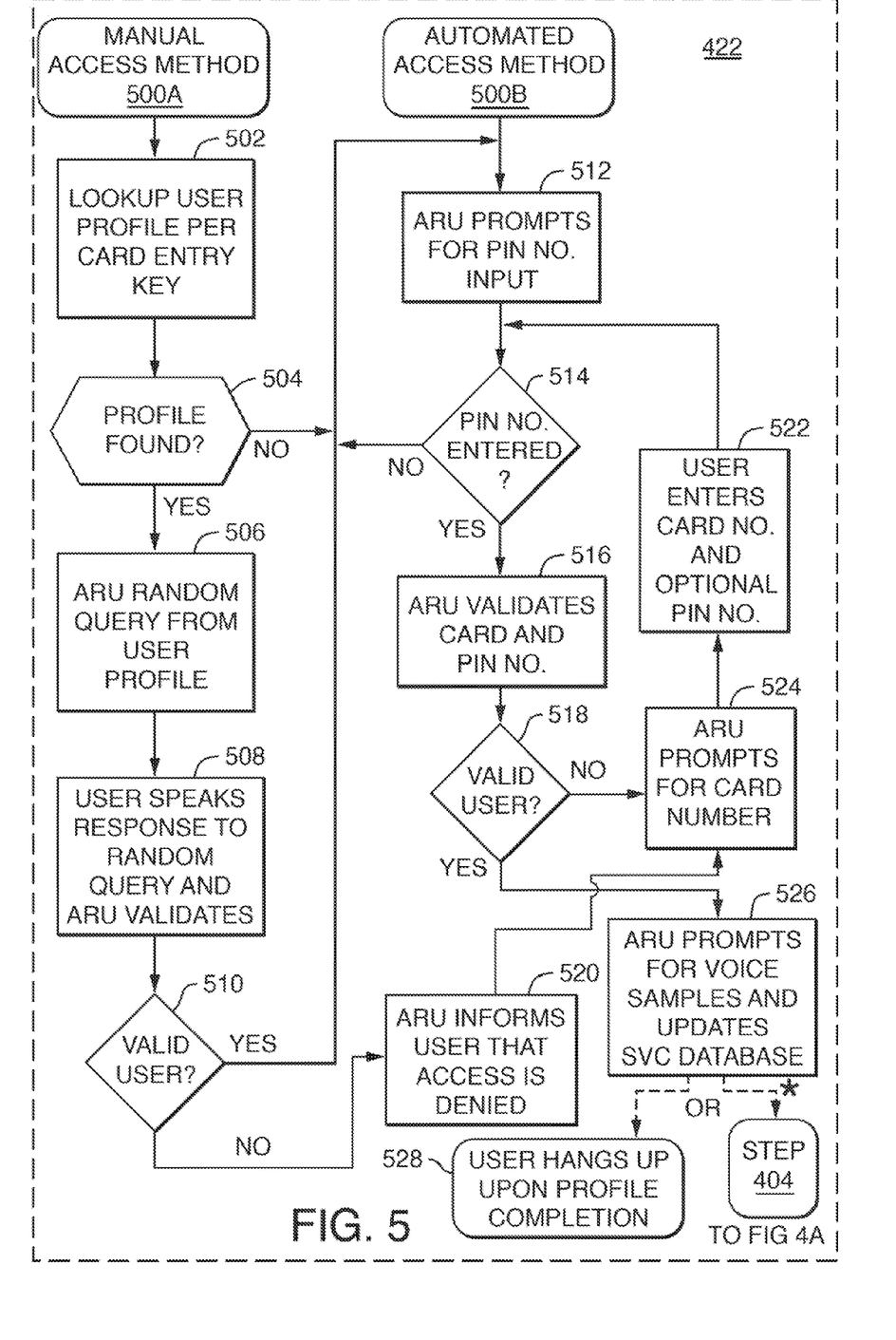
FIG. 5 depicts a flow chart of a voice profile configuration process for use in the voice-based validation method of the present invention.

Referring now to FIG. 5, depicted therein is a flow chart of the voice profile configuration subsystem/process 422 for use in the voice-based validation method described hereinabove. It should be apparent to those skilled in the art that the voice profile configuration/access process may preferably be comprised of a manual access method 500A (user directed method wherein the user enters a pre-defined key) which interfaces with an automated access method 500B (which is directed based on the lack of a user profile) as described hereinbelow.

In a presently preferred exemplary embodiment of the present invention, it is preferably required that a user voice profile database and service node be available, along with a card configuration item that specifies the required use of the database. The user database record definition could be present in the database, or could be built dynamically upon initial entry into the configuration subsystem 422.

In the manual access method 500A, a user profile lookup is performed per card entry key (step 502). If a profile is found (decision block 504), the ARU proceeds with a random query process based on the profile (step 506). After the user speaks an answer in response thereto, the ARU proceeds to validate the user's voice sample based on the SVC profile (step 508). If the user is determined to be a valid user (decision block 510), the flow control passes to step 512 wherein the ARU prompts the user for PIN input. This step is also reached when the decision block 504 determines that there is no pre-existing voice profile for the user (i.e., the profile needs to be created for the first time in the system). Furthermore, in the presently preferred exemplary embodiment of the present invention, the automated access method 500B also commences with this step (step 512).

After determining that a PIN is entered by the user (decision block 514) responsive to the ARU prompting (step 512), the ARU proceeds to validate the card and its PIN (step 516). If the card is determined to be a valid card (decision block 518), the ARU prompts the user for voice samples by directing personalized questions (the order of which may be random for each configuration access) to the user and obtaining appropriate responses therefor. Thereafter, the voice samples are added to the updated SVC profile database (step 526). The user may subsequently complete the configuration process by hanging up the phone terminal used for accessing the configuration subsystem, or by pressing a pre-defined key (e.g., "*") to return to step 404 in FIG. 4A.

If the card is determined to be an invalid card as determined by the decision block 518, the ARU chimes and prompts the user for another card number or a correct card number (step 524). When the user enters the card number and optional PIN at this point (step 522), the ARU proceeds to validate the card again. The configuration system access process repeats until either a valid card is entered, or the user hangs up.

Referring back to the decision block 510 in the manual entry process 500A, if the user is determined to be an invalid user, the ARU informs the user that access is denied (step 520) and prompts for the card number and PIN (step 524) as before. Optionally, the system could initiate a fraud alarm and/or effect a forced hang up in the event of consecutive failed attempts to access the system. Accordingly, when the voice profile is configured for the first time, a card indicium is preferably used for authorizing initial access to the SVC database.

Subsequent access to the configuration system, once initialized by the user, will typically only be provided by the manual access method since the automated access method in a preferred embodiment only applies when the system detects an invalid or undefined profile. Also, it should be noted that subsequent access initiated by the user will be gained preferably only through biometric means, i.e., access would not be granted by the card assigned PIN since profile data is available for validation purposes.

Based on the foregoing, it should be appreciated that the present invention advantageously provides a highly effective transaction card validation system which intimately couples the card with the legitimate user's inherently personal information such as voice samples and other biometric profiles. Those skilled in the art should recognize that the random nature of the user profile query and the unique user voiceprint(s) essentially guarantee that only the legitimate owner can be the card user for any given transaction. Additionally, the user biometric validation method of the present invention is independent of the conventional PIN-based validation methodology, and the teachings of the present invention may be advantageously coupled with other fraud detection mechanisms in order to further enhance security. It should be realized that today's network and server performance, and advanced voice recognition and other biometric pattern recognition technologies permit fairly rapid access times for the card validation scheme of the present invention.

Those skilled in the art should further appreciate that both card-issuing companies and their customers benefit from the card validation scheme described herein. The cost savings realized due to fraud prevention will balance any delays in access times, and customers can justify the card access overhead by the added comfort that their card is secure at all times—they would no longer have to worry about losing a card, remembering a PIN, or having to conceal a card number and its PIN in a wallet or other personal effect(s), or have to deal with any fraud aftermath. Moreover, because the profiles can be modified periodically or each time the card is used for a transaction with new options/responses, card access security is further buttressed.

It is believed that the operation and construction of the present invention will be apparent from the foregoing Detailed Description. While the method and system shown and described have been characterized as being preferred, it should be readily understood that various changes and modifications could be made therein without departing from the scope of the present invention as set forth in the following claims. For example, although the presently preferred exemplary embodiment of the present invention has been described as an active fraud prevention system, it is possible to implement the present invention in a passive mode, i.e., as an auxiliary system which would intervene only in the event of fraud detection by an existing system. In such a scenario, the validation system of the present invention would query the user to verify access only when fraud is suspected.

In addition, while the voice-based validation scheme for a calling card transaction has been particularly exemplified hereinabove, it should be apparent to those skilled in the art upon reference hereto that the teachings of the present invention may be advantageously practiced in the context of accessing personal information such as a bank account, employment records, medical records, credit reports, or private club membership materials, e-commerce accounts, brokerage accounts, and the like. Accordingly, it should be clearly understood that these and other variations, substitutions, additions, re-arrangements and modifications are contemplated to be within the ambit of the present invention whose scope is solely limited by the claims set forth below.

What is claimed is:

1. A method of validating a user for a transaction to be effectuated by using a transaction card, comprising:
configuring a profile for said user, said profile including a plurality of biometric samples and a plurality of Dual Tone Multi Frequency (DTMF) sample responses received from the user, the plurality of biometric samples and the plurality of DTMF sample responses corresponding to a plurality of questions;

associating said profile with an indicium assigned to said transaction card;

interrogating said user when said transaction is attempted by said user, wherein said interrogation includes querying said user for a biometric response associated with a randomly selected one of said plurality of questions and a DTMF response associated with another randomly selected one of said plurality of questions;

monitoring said biometric and DTMF responses generated with respect to said user in response to the interrogation;

determining if said biometric response matches a biometric sample in said biometric profile corresponding to the randomly selected one of said plurality of questions;

determining if said DTMF response matches a DTMF sample in said profile corresponding to the another randomly selected one of said plurality of questions; and if said biometric response matches the biometric sample and said DTMF response matches the DTMF sample, approving said user for said transaction.

2. The method of validating a user for a transaction as set forth in claim 1, wherein at least a portion of said plurality of biometric samples comprises voice samples generated by said user responsive to a plurality of questions directed to said user in said configuring step, and further wherein said biometrical interrogation involves querying said user for a voice response to a randomly selected question of said plurality of questions.

3. The method of validating a user for a transaction as set forth in claim 1, further comprising:

prompting said user to input said indicium assigned to said transaction card after determining that said biometric response matches a biometric sample of said profile;

determining if said indicium is a valid personal identification number operating as a password associated with said transaction card; and denying access to said user for said transaction if said indicium is not a valid personal identification number associated with said transaction card.

4. The method of validating a user for a transaction as set forth in claim 1, further comprising:

prompting said user to input said indicium assigned to said transaction card if said biometric response does not match a biometric sample of said profile;

confirming that said indicium is a valid personal identification number associated with said transaction card; and approving said user for said transaction upon said confirmation.

5. The method of validating a user for a transaction as set forth in claim 1, wherein configuring the profile for said user is effectuated manually.

6. The method of validating a user for a transaction as set forth in claim 1, wherein configuring the profile for said user is effectuated automatically.

7. The method of validating a user for a transaction as set forth in claim 1, further comprising updating said profile for said user.

8. A method of validating a user for a call to be effectuated over a Public Switched Telephone Network (PSTN) using a calling card, comprising:

configuring a personalized profile for said user, said personalized profile including a plurality of voice samples elicited from said user in response to a plurality of personalized questions directed to said user;

populating at least a portion of said personalized profile with a plurality of Dual Tone Multi Frequency (DTMF) sample responses elicited from said user in said configuration step;

associating said personalized profile with an indicium assigned to said calling card;

determining if a voice verification is needed with respect to said user when said call is attempted by said user;

if so, querying said user for a voice response to a question that is randomly selected from said plurality of personalized questions;

prompting said user to input a DTMF response in response to said question that is randomly selected from said plurality of personalized questions;

verifying if said voice response matches a corresponding voice sample in said voice personalized profile;

verifying whether said DTMF response matches a corresponding DTMF sample response in said personalized profile;

if said voice response matches the corresponding voice sample and said DTMF response matches the corresponding DTMF sample response, approving said user for said call involving said calling card; and denying access to said user for said call if said voice response does not match the corresponding voice sample and said DTMF response does not match the corresponding DTMF sample response in said personalized profile.

9. The method of validating a user for a call as set forth in claim 8, further comprising:

prompting said user to input said indicium assigned to said calling card after verifying that said voice response matches a corresponding voice sample in said personalized profile;

determining if said indicium is a valid personal identification number associated with said calling card; and denying access to said user for said call if said indicium is not a valid personal identification number associated with said calling card.

10. The method of validating a user for a call as set forth in claim 8, further comprising:

prompting said user to input said indicium assigned to said calling card after verifying that said voice response does not match a corresponding voice sample in said personalized profile;

confirming that said indicium is a valid personal identification number associated with said calling card; and approving said user for said call upon said confirmation.

11. An access control system for use with a transaction-card-based scheme, said system comprising:

a network operable with a terminal, said terminal for interacting with a user in association with a transaction card;

a controller disposed in the network to query said user when said user attempts a transaction using said transaction card;

a server disposed in the network, said server responding to messages from said controller with respect to querying said user; and a profile database coupled to said server, said profile database having a plurality of biometric samples and a plurality of Dual Tone Multi Frequency (DTMF) samples inherently coupled to said user, wherein said plurality of biometric samples and said DTMF samples relate to a plurality of questions, and wherein said biometric samples and said DTMF samples are associated with an indicium assigned to said transaction card such that when said user attempts said transaction, said controller queries said user for responses relating to a randomly selected one of the biometric samples and a randomly selected one of the DTMF samples and, if said response does not match corresponding entries in said profile database, access is denied to said user for said transaction.

12. The access control system for use with a transaction-card-based scheme as set forth in claim 11, wherein said entry associated with said user comprises at least one of a fingerprint, retinal scan, palm print, or implanted ID chip associated with said user.

13. The access control system for use with a transaction-card-based scheme as set forth in claim 11, wherein said entry associated with said user comprises a voiceprint associated with said user.

14. The access control system for use with a transaction-card-based scheme as set forth in claim 11, wherein said controller comprises an Automated Response Unit associated with a Public Switched Telephone Network.

15. The access control system for use with a transaction-card-based scheme as set forth in claim 11, wherein said terminal comprises a wireline phone.

16. The access control system for use with a transaction-card based scheme as set forth in claim 11, wherein said terminal comprises an Internet phone.

17. The access control system for use with a transaction-card-based scheme as set forth in claim 11, wherein said terminal comprises a wireless medium device.

* * * * *